J. G. SCHREUDER & V. K. SPICER.
APPARATUS FOR AUTOMATICALLY CONTROLLING THE SPEED OF TRAINS.
APPLICATION FILED AUG. 3, 1907.

903,412.

Patented Nov. 10, 1908.

4 SHEETS—SHEET 1.

WITNESSES
R A Balderson
W W Swartz

INVENTORS
J. G. Schreuder,
V. K. Spicer,
by Bakewell, Byrnes & Parmelee
their attys.

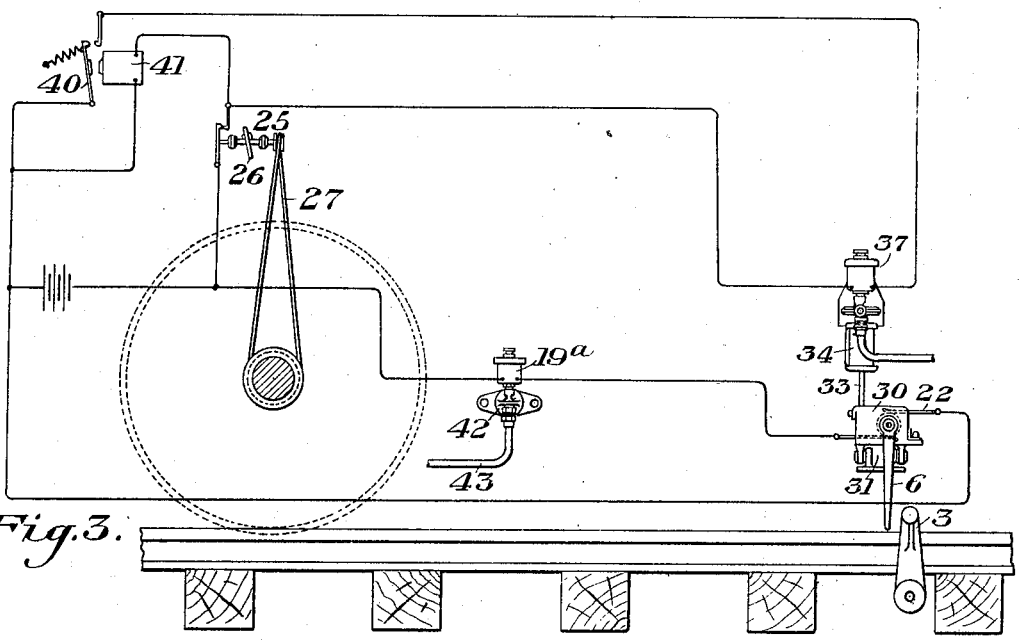
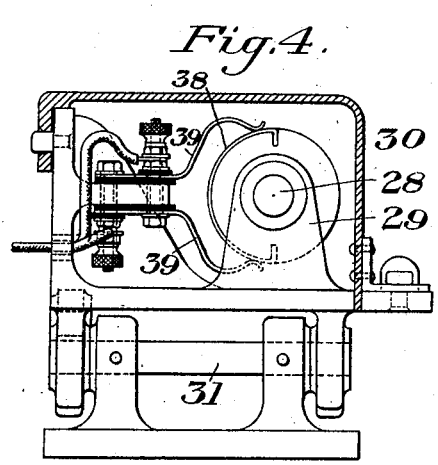
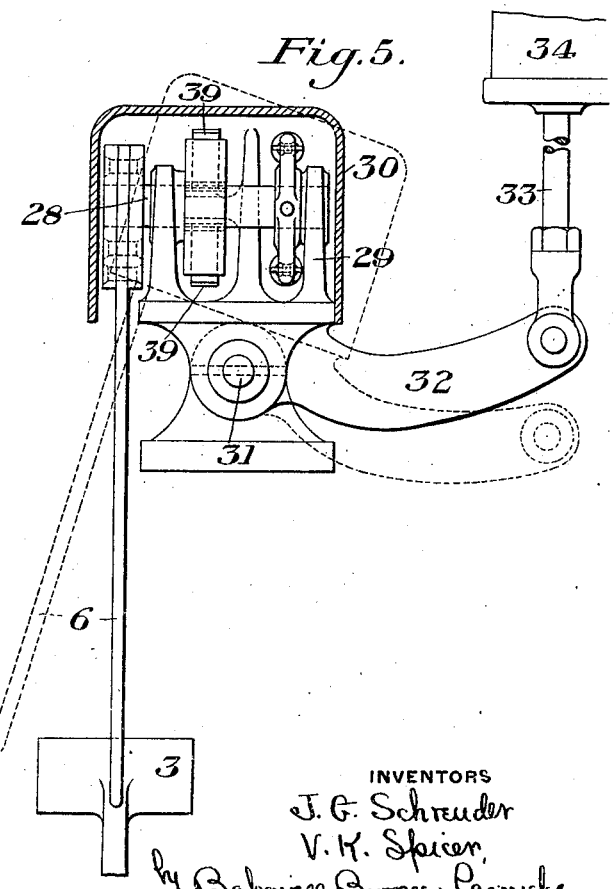

J. G. SCHREUDER & V. K. SPICER.
APPARATUS FOR AUTOMATICALLY CONTROLLING THE SPEED OF TRAINS.
APPLICATION FILED AUG. 3, 1907.
903,412.
Patented Nov. 10, 1908.
4 SHEETS—SHEET 3.
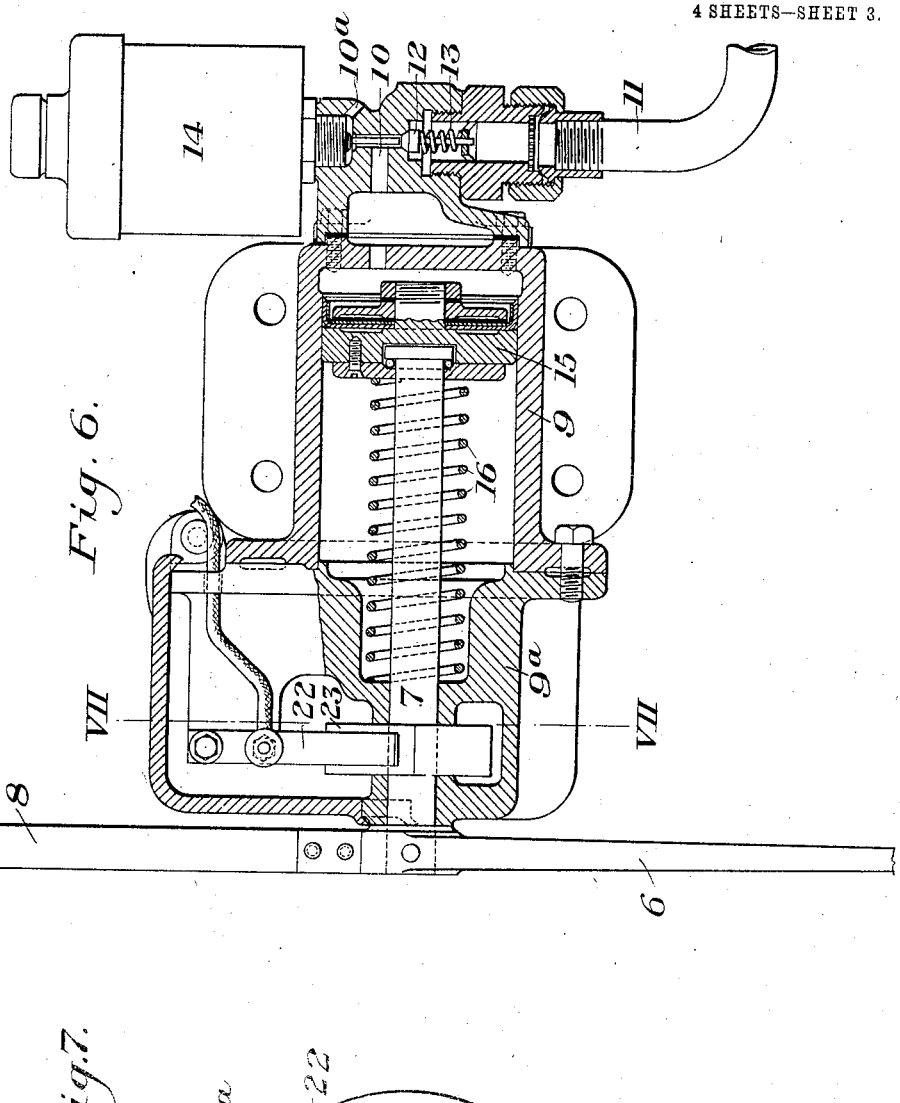
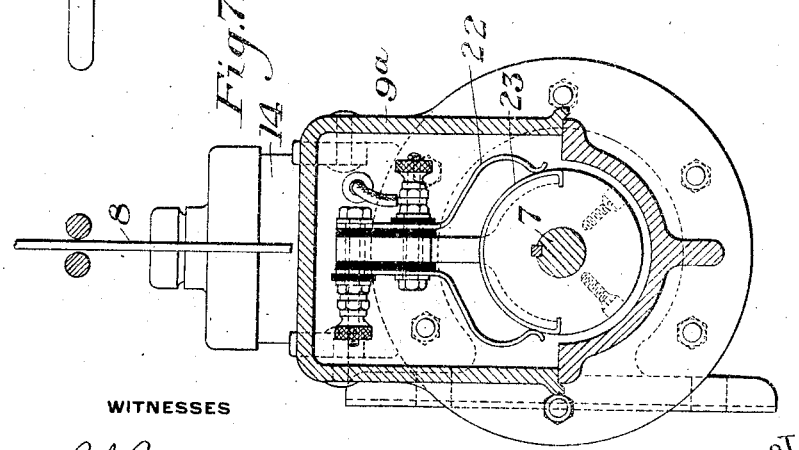
WITNESSES
R H Balderson
W W Swartz
INVENTORS
J. G. Schreuder
V. K. Spicer,
by Bakewell, Byrnes & Parmelee,
their Attys J. G. SCHREUDER & V. K. SPICER.
APPARATUS FOR AUTOMATICALLY CONTROLLING THE SPEED OF TRAINS.
APPLICATION FILED AUG. 3, 1907.
903,412.
Patented Nov. 10, 1908.
4 SHEETS—SHEET 4.
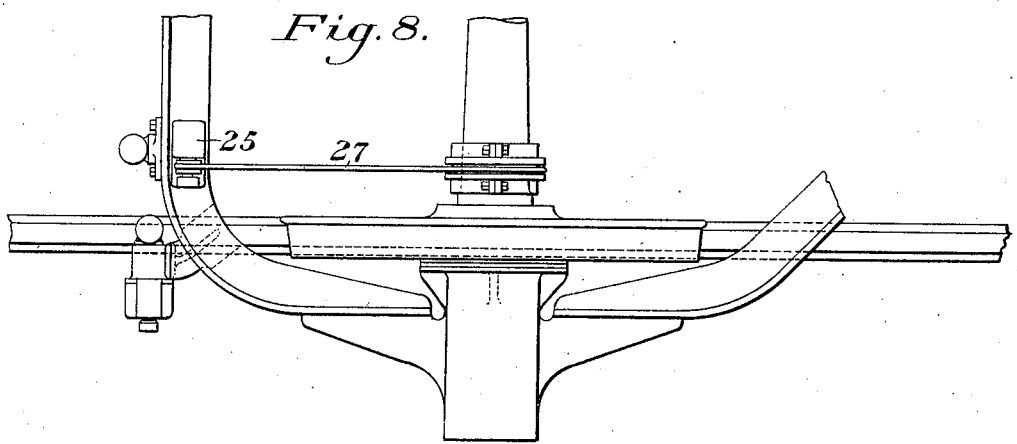
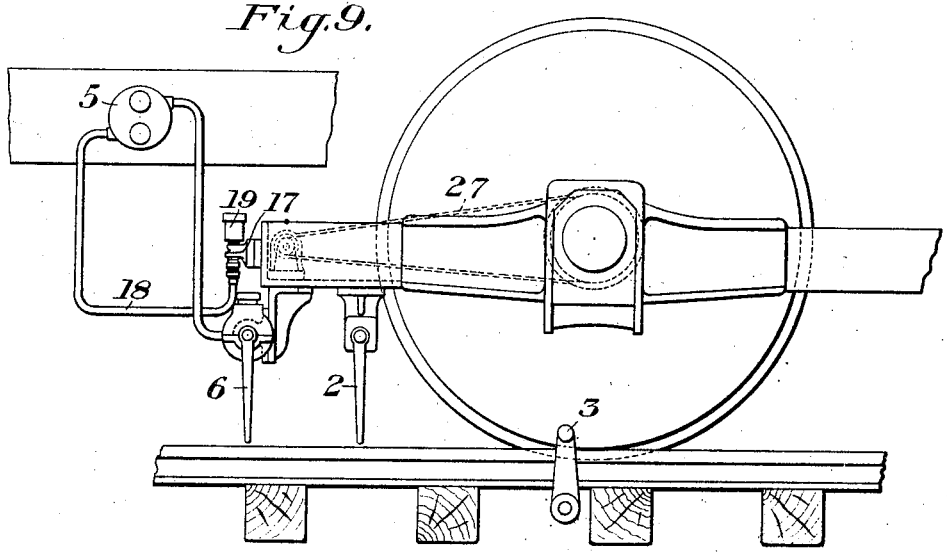
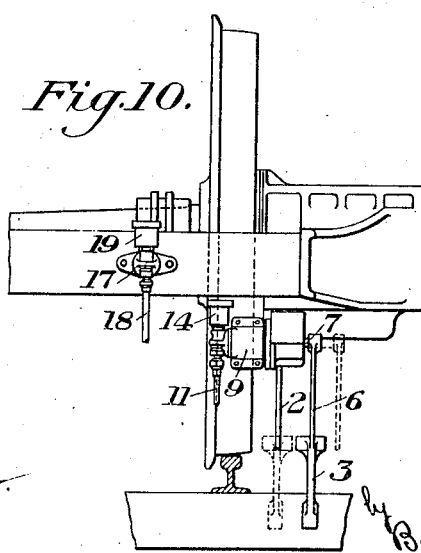
WITNESSES
R. A. Balderson
W. W. Swartz
INVENTORS
J. G. Schreuder,
V. K. Spicer,
by Bakewell, Byrnes & Parmelee,
their Attys.

UNITED STATES PATENT OFFICE.

JENS G. SCHREUDER, OF EDGEWOOD PARK, PENNSYLVANIA, AND VIBE K. SPICER, OF CHICAGO, ILLINOIS, ASSIGNORS TO THE UNION SWITCH & SIGNAL COMPANY. OF SWISSVALE, PENNSYLVANIA, A CORPORATION OF PENNSYLVANIA.

APPARATUS FOR AUTOMATICALLY CONTROLLING THE SPEED OF TRAINS.

No. 903,412.  Specification of Letters Patent.  Patented Nov. 10, 1908.

Application filed August 3, 1907. Serial No. 386,935.

*To all whom it may concern:*

Be it known that we, JENS G. SCHREUDER, of Edgewood Park, Allegheny county, Pennsylvania, and VIBE K. SPICER, of Chicago, Cook county, Illinois, have invented a new and useful Apparatus for Automatically Controlling the Speed of Trains, of which the following is a full, clear, and exact description, reference being had to the accompanying drawings, forming part of this specification, in which—

Figure 1:
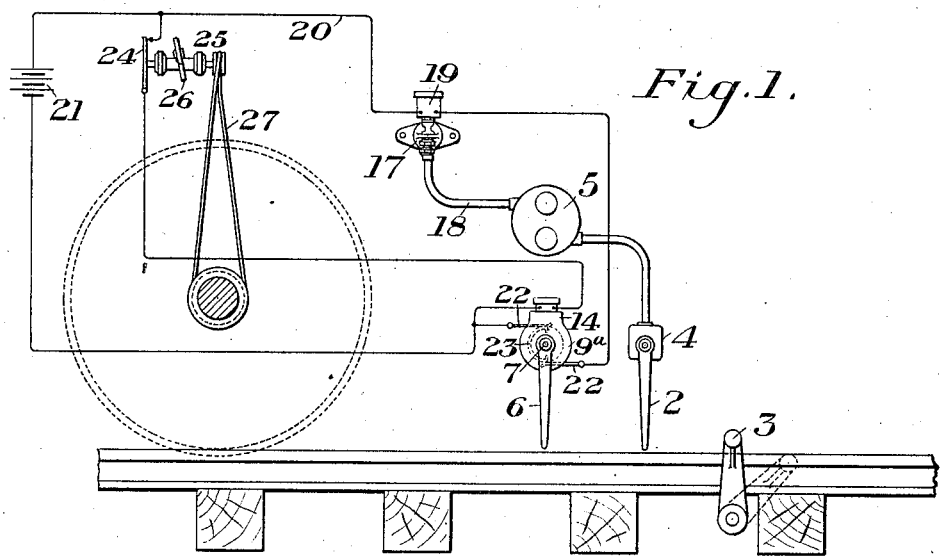
Figure 2:
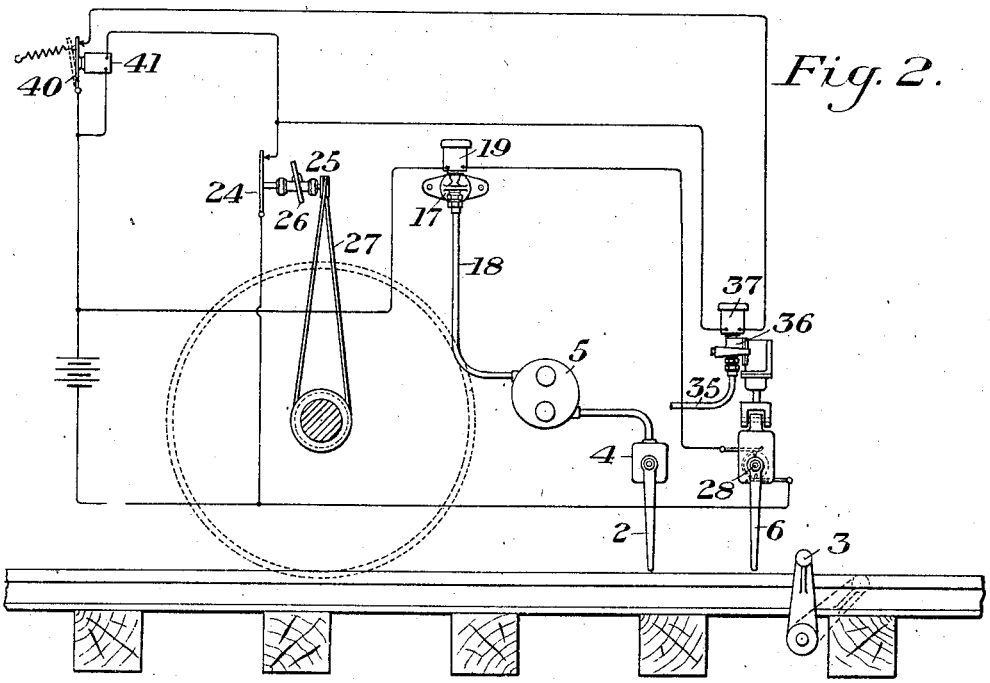

Figures 1, 2 and 3 are diagrammatic views illustrating different embodiments of our invention; Fig. 4 is a detail sectional view showing one form of the trip-controlled electric switch; Fig. 5 is a detail view partly in section and partly in side elevation showing one form of mechanism for shifting the trip arm; Fig. 6 is a secetional view showing another form of mechanism for shifting the trip arm; Fig. 7 is a section on the line VII—VII of Fig. 6; Fig. 8 is a plan view showing one way of driving the speed governor; Fig. 9 is a side view of the same; and Fig. 10 is an end view; Figs. 8, 9 and 10 also showing one way of mounting the parts upon the frame of the locomotive or other vehicle.

Our invention has relation to the automatic control of railway trains or other vehicles, in which the engine or other vehicle, is provided with a trip actuating mechanism for operating the brakes to bring the train to a full stop, and with other trip actuating mechanism for effecting a service application of the brakes, the latter mechanism being inoperative unless the speed of the train is in excess of a predetermined limit. A system of this kind is more fully described and claimed in our application Serial No. 386,932 of even date herewith.

The present invention relates more particularly to improvements for effecting the lateral shifting of the trip arm which actuates the valve controlling the service application of the brakes for the purpose of moving said arm into and out of position to be engaged by the track trips; and is designed to provide electro-pneumatic mechanism of novel character, for this purpose, the operation of which is controlled by the speed of the train, and whereby the trip arm is held in inoperative position when the train speed is at or below the desired limit, but is automatically moved into operative position when the train speed exceeds such limit.

A further object is to provide means whereby the engineer may to a certain extent control the operation of the mechanism to shift the trip out of operative position when the speed is below the limit.

Referring first to the form of our invention, which is illustrated diagrammatically in Fig. 1, the numeral 2 designates a pivoted trip arm, which is carried by the train, preferably by the engine, and which is designed to engage a track trip 3 to thereby actuate valve mechanism 4 and 5 of any well known character for the purpose of bringing the train to a full stop. This mechanism forms no part of our present invention.

6 designates a second depending trip arm, which is carried by a spindle 7, and which is normally held in its central or vertical position by means of a suitable spring 8, (Figs. 6 and 7). The spindle 7 is journaled and is movable endwise within a casing 9ª, to which is secured a fluid pressure cylinder 9 which is connected with a suitable source of fluid supply by means of an inlet port 10 and pipe 11. The port 10 is held closed by a suitable valve 12 which is held seated by a spring 13 when the speed of the train is above the predetermined limit, as hereinafter described and is opened by an electro-magnet 14 when the speed of the train is below the predetermined limit. The spindle 7 carries within the cylinder 9 a piston 15 which is designed to be moved in one direction by pressure admitted from the pipe 11 when the valve 12 is opened as hereinafter described, and which is normally held in the position shown by the action of the spring 16. When held in this position the depending trip arm 6 is out of alinement with the track trip 3 so as to pass said trip without being operated.

17 designates any suitable escape valve which is connected by pipe 18 with the train brake system, so that the exhaust of air from the said valve will effect a gradual reduction in the brake pipe pressure and thereby a partial application of the brakes. This may be effected directly by the valve 17, or the escape of air from the pipe 18 through said valve may cause the operation of suitable valve mechanism indicated diagrammatically at 5 whereby this result is effected. This valve mechanism 5 may be of any suitable form, such as that manufactured by the Westinghouse Air Brake Company, and described and claimed in the application of Walter V. Turner, Serial No. 373,243, filed May 13th, 1907. The valve 17 is normally held in a closed position by an electro-magnet 19. This magnet is connected in a circuit 20 which includes a battery or other source of supply 21, and which is completed by means of two contact fingers 22, which are normally connected by a contact 23 mounted on an insulating roller on the spindle 7 within the casing 9ª.

The contact band 23 extends around a portion of the periphery of the roller to which it is secured, and the contact fingers 22 normally bear upon the end portions thereof, so that a very slight rotation of the spindle when actuated by the trip arm 6 is sufficient to break this circuit. When the circuit is broken at this point, the magnet 19 is deënergized and opens the valve 17 to permit the escape of air from the brake pipe. As above stated, however, the trip arm 6 is held out of position to be operated by the track trip 3, as long as the speed of the train is below the predetermined limit, and is moved into operative position only when the speed of the train exceeds the predetermined limit. To this end, the magnet 14 is connected in parallel with the battery 21 through a normally closed switch 24 whose movable member is arranged to be acted upon by a centrifugal device 25 driven from one of the axles of the engine or car. This centrifugal device may be of any well-known form, such as an ordinary ball governor. In the form indicated it has a weight member 26 normally in an oblique position, but which tends to assume a vertical position as its speed of rotation increases. This movement of the weight member effects the opening of the switch 24 and breaks the circuit of the magnet 14. This opens the valve 12 and admits pressure to the cylinder 9, thereby actuating the piston 15 to move the trip arm 6 into operative position, where it is held so long as the valve 12 remains open.

One mode of driving the centrifugal device from one of the axles is indicated in Figs. 1, 8 and 9, being by a belt 27. This, however, may be effected in any suitable manner. The valve 12 will remain open until the speed of the train has been reduced to a point where the centrifugal device 25 will operate to again close the switch 24 and thereby energize the magnet 14. This will open the valve 12 and close the fluid exhaust from the cylinder 9 through the valve 10ª when the spring 16 immediately returns the piston and trip to the position shown in Fig. 6.

In the modification shown in Figs. 2 and 5, instead of mounting the trip arm 6 upon the laterally movable spindle, said arm is attached to a spindle 28 which is journaled in suitable bearings 29 of a casing 30. This casing is mouted on a pivot 31, and has a projecting arm 32, which is connected to the rod 33 of a piston working in a fluid pressure cylinder 34. This cylinder 34 is connected with a supply pipe 35 through a valve 36 which is similar to that shown in Fig. 6, and which is controlled by magnet 37 whose action is like that of the magnet 14. That is to say, the valve is closed by a spring to shut off air from the cylinder except when the magnet 14 is energized by a reduction in the train speed below the predetermined rate. The casing 30 and trip arm 6 are therefore held in the operative position shown in full lines in Fig. 5, whenever the train speed is above the limit, but when the speed falls below the limit and air is admitted to the cylinder 34, the piston thereof is actuated to move the casing to the inoperative position shown in dotted lines in said figure, thereby bringing the arm 6 in position not to be engaged by the track trip 3. The spindle 28 has a contact band 38 which is normally engaged by the contact fingers 39 to complete the circuit of the release valve magnet 19. This contacting device which is shown in Fig. 4 is similar to that shown in Fig. 7 before described.

In the arrangement shown in Fig. 2, we also provide the circuit of the magnet 37 with a circuit controller 40 which is placed in the engineer's cab or at some other convenient point of operation. The magnet 41 of this circuit controller is connected in series with the magnet 37, and also in series with the switch arm 24, and will therefore be energized only at such times as the switch arm 24 is in its closed position.

The magnet 37 cannot be energized unless both switches 24 and 40 are in closed position. When the speed of the train exceeds the predetermined limit, the switch 24 opens, thereby breaking the circuit of the coil 41 and opening the switch 40, deënergizing the magnet 37 and putting the fluid pressure into the cylinder 34 to move the trip arm 6 to operative position. The arm will remain in this position, notwithstanding the reduction in speed of the train may close the switch 24 until such time as the engineer closes the switch 40. This switch permits the engineer when the speed is below the limit, to energize the magnet 37 and shift the trip 6 to inoperative position so that he may pass a track trip 3 without operation of the trip 6.

The arrangement shown in Fig. 3 is similar to that shown in Fig. 2, except that the valve mechanism 5 is omitted and the magnet 19ª is arranged to operate an exhaust valve 42 to permit the fluid to escape from the pipe 48. The escape of air from this valve may itself produce a service application of the brakes, or it may operate other valve mechanism through which service application is controlled, and which may also cause the operation of signals in the engineer's cab.

The track trips 3 may be moved into and out of operative position by connection with the home and distant signal movements as described in our application above referred to. Similar trips may also be temporarily or permanently fastened to the track at any desired point along the line where it is desired to reduce the speed.

It will be obvious to those skilled in the art that various modifications may be made in the construction and arrangement of the parts without departing from the spirit and scope of our invention.

What we claim is:—

1. In train-control apparatus, a laterally shiftable trip arm, a fluid pressure device for shifting the arm laterally into and out of operative position, and electro-magnetic means controlled by the speed of the train and controlling the operation of the fluid pressure device; substantially as described.

2. In train-control apparatus, a laterally shiftable trip arm, a pneumatic motive device for operating the same, an electro-magnet for controlling the air supply to the motor, and a centrifugally acting speed governor for controlling the circuit of the magnet; substantially as described.

3. In train-control apparatus, a laterally shiftable trip arm, a pneumatic motor for operating said arm, an electro-magnet for controlling the air supply to the motor, and a speed governor driven by the train, the circuit of said magnet being controlled in part by the speed governor; substantially as described.

4. In train-control apparatus, a shiftable trip arm, a motive device for operating the same, a magnet for controlling the operation of the motive device, a circuit controlling said magnet, and means controlled by the speed of the train for controlling said circuit; substantially as described.

5. In train-control apparatus, a shiftable trip, means for holding the same in operative position when the speed of the train exceeds a predetermined limit, and manually controlled means for moving the trip out of operative position when the speed of the train is below the predetermined limit; substantially as described.

6. In train-control apparatus, a shiftable trip, a motive device for shifting the same, a magnet for controlling the operation of the motive device, a speed-controlled switch in the circuit of the magnet, and a manually operated switch also in said circuit; substantially as described.

7. In apparatus for train-control, a shiftable trip, a normally closed escape valve, a magnet for opening said valve, a circuit breaker for the circuit of said magnet controlled by the trip, and a speed control device for controlling the operation of the trip; substantially as described.

8. In apparatus for train control, a trip, a tiltable carrier therefor, a motive device for tilting the carrier to shift the trip, and speed-controlled electro-magnetic means for controlling the operative position of the trip through the motive device; substantially as described.

9. In apparatus for train control, a trip, a tiltable carrier therefor, a motive device for tilting the carrier to shift the trip, a magnet for controlling the motive device, a speed-controlled switch in the circuit of said magnet, and a manual switch also in said circuit; substantially as described.

10. In train control apparatus, a shiftable trip arm, a speed control device arranged to be operated by said arm, and electro-pneumatic means controlled by the speed of the train for controlling the position of the shiftable trip-arm; substantially as described.

In testimony whereof, we have hereunto set our hands.

JENS G. SCHREUDER.
VIBE K. SPICER.

Witnesses as to Jens G. Schreuder:
C. C. WHITE,
JAMES CHALMERS, Jr.

Witnesses as to Vibe K. Spicer:
GEO. MARLOFF,
W. SCLEVENGER.